(12) United States Patent
Healy et al.

(10) Patent No.: US 11,338,815 B1
(45) Date of Patent: May 24, 2022

(54) TELEMATICS SYSTEM, APPARATUS AND METHOD

(71) Applicant: United Services Automobile Association, San Antonio, TX (US)

(72) Inventors: Jodi Jean Healy, Johns Creek, GA (US); Robert Kenneth Dohner, San Antonio, TX (US); Christine Marie Brown, Helotes, TX (US); James P. Hillman, Kennewick, WA (US); Ramsey Devereaux, San Antonio, TX (US); Bharat Prasad, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 149 days.

(21) Appl. No.: 15/801,096

(22) Filed: Nov. 1, 2017

Related U.S. Application Data

(63) Continuation of application No. 14/941,248, filed on Nov. 13, 2015, now Pat. No. 9,830,665.
(Continued)

(51) Int. Cl.
*B60W 40/09* (2012.01)
*G06Q 40/08* (2012.01)
(Continued)

(52) U.S. Cl.
CPC ............ *B60W 40/09* (2013.01); *G06Q 40/08* (2013.01); *G07C 5/02* (2013.01); *G07C 5/08* (2013.01);
(Continued)

(58) Field of Classification Search
CPC .......... G06Q 30/0269; G06Q 30/0271; G06Q 30/0631; G06Q 40/08; G06Q 50/30;
(Continued)

(56) References Cited

U.S. PATENT DOCUMENTS

| | | | | |
|---|---|---|---|---|
| 3,878,915 A | * | 4/1975 | Purland ................. | G01P 3/4802 180/170 |
| 5,797,134 A | * | 8/1998 | McMillan .......... | G06Q 30/0283 705/400 |

(Continued)

FOREIGN PATENT DOCUMENTS

WO    WO-2013137885 A1 *  9/2013  ....... G06Q 10/06398

OTHER PUBLICATIONS

Gasson, Mark N. et al., "Normality mining: Privacy implications of behaviorial profiles drawn from GPS enabled mobile phones", IEEE Transactions on Systems, Man, and Cybernetics—Part C: Applications and Reviews, vol. 41 No. 2, Mar. 2011, pp. 251-261. (Year: 2011).*

*Primary Examiner* — David A Testardi
(74) *Attorney, Agent, or Firm* — Locke Lord LLP; Christopher J. Capelli

(57) ABSTRACT

A system and process for using telematics data to determine a vehicle operator. Telematics data is captured from a telematics device which retrieves data from a vehicle associated with a plurality of vehicle operators. A driver electronic signature is determined from the captured telematics data and then compared to determined driver signatures stored in memory and associated with the vehicle from which the telematics data is captured. A vehicle operator is then determined from comparing the determined driver signature with driver signatures stored in memory.

5 Claims, 9 Drawing Sheets

Related U.S. Application Data

(60) Provisional application No. 62/079,651, filed on Nov. 14, 2014.

(51) Int. Cl.
  *G07C 5/08* (2006.01)
  *G07C 5/02* (2006.01)
  *B60W 40/08* (2012.01)

(52) U.S. Cl.
  CPC ... *G07C 5/0816* (2013.01); *B60W 2040/0809* (2013.01); *B60W 2540/30* (2013.01)

(58) Field of Classification Search
  CPC . G07C 5/008; G07C 5/02; G07C 5/08; G07C 5/0808; G07C 5/0816; G07C 5/0891; B60W 40/09; B60W 2040/0809; B60W 2540/28; B60W 2540/30; B60W 50/085; B60W 2540/043; B60R 11/04
  See application file for complete search history.

(56) References Cited

U.S. PATENT DOCUMENTS

| | | | | |
|---|---|---|---|---|
| 6,211,777 | B1 * | 4/2001 | Greenwood | B60Q 1/52 180/272 |
| 6,225,890 | B1 * | 5/2001 | Murphy | B60R 25/241 340/426.19 |
| 8,930,231 | B2 * | 1/2015 | Bowne | G07C 5/0858 705/4 |
| 8,989,914 | B1 * | 3/2015 | Nemat-Nasser | G06F 7/00 701/1 |
| 9,104,537 | B1 * | 8/2015 | Penilla | G06F 17/00 |
| 9,139,091 | B1 * | 9/2015 | Penilla | H04W 4/44 |
| 9,141,582 | B1 * | 9/2015 | Brinkmann | G07C 5/0808 |
| 9,141,995 | B1 * | 9/2015 | Brinkmann | G07C 5/02 |
| 9,171,268 | B1 * | 10/2015 | Penilla | G06Q 10/02 |
| 9,524,269 | B1 * | 12/2016 | Brinkmann | G07C 5/0808 |
| 9,830,665 | B1 * | 11/2017 | Healy | G06Q 40/08 |
| 10,032,226 | B1 * | 7/2018 | Suizzo | G06Q 10/10 |
| 10,311,749 | B1 * | 6/2019 | Kypri | G09B 19/167 |
| 10,410,142 | B1 * | 9/2019 | Hess | G06Q 10/00 |
| 2003/0112133 | A1 * | 6/2003 | Webb | G07C 5/008 340/436 |
| 2005/0040224 | A1 * | 2/2005 | Brinton | G06Q 10/06 235/376 |
| 2005/0071052 | A1 * | 3/2005 | Coletrane | G07C 5/008 701/1 |
| 2007/0109107 | A1 * | 5/2007 | Liston | B60R 25/102 340/426.15 |
| 2007/0158128 | A1 * | 7/2007 | Gratz | B60R 25/1004 180/287 |
| 2007/0257782 | A1 * | 11/2007 | Etcheson | G07C 5/008 340/425.5 |
| 2008/0178855 | A1 * | 7/2008 | Petersen | B60R 25/24 123/640 |
| 2008/0297330 | A1 * | 12/2008 | Jeon | B60R 25/102 340/426.11 |
| 2008/0319604 | A1 * | 12/2008 | Follmer | G07C 5/0891 701/33.4 |
| 2009/0076682 | A1 * | 3/2009 | Ghoneim | B60W 40/08 701/36 |
| 2009/0167559 | A1 * | 7/2009 | Gaddy | G08G 1/0962 340/901 |
| 2009/0222143 | A1 * | 9/2009 | Kempton | H02J 9/062 700/291 |
| 2009/0240391 | A1 * | 9/2009 | Duddle | B60W 40/09 701/31.4 |
| 2009/0254259 | A1 * | 10/2009 | The | G01S 19/52 701/70 |
| 2010/0017236 | A1 * | 1/2010 | Duddle | G06Q 40/08 705/4 |
| 2010/0042303 | A1 * | 2/2010 | Fiske | B60W 30/146 701/70 |
| 2010/0063850 | A1 * | 3/2010 | Daniel | G06Q 40/08 705/4 |
| 2010/0082245 | A1 * | 4/2010 | Patenaude | H04W 4/024 701/533 |
| 2010/0087987 | A1 * | 4/2010 | Huang | B60W 40/08 701/36 |
| 2010/0238009 | A1 * | 9/2010 | Cook | G07C 5/085 340/439 |
| 2010/0262348 | A1 * | 10/2010 | Nallapa | B60W 30/188 701/70 |
| 2011/0039581 | A1 * | 2/2011 | Cai | G01S 19/14 455/456.4 |
| 2011/0077028 | A1 * | 3/2011 | Wilkes, III | B60W 50/14 455/456.3 |
| 2011/0195699 | A1 * | 8/2011 | Tadayon | H04M 3/53 455/418 |
| 2011/0264246 | A1 * | 10/2011 | Pantoja | G06Q 30/02 700/92 |
| 2012/0053824 | A1 * | 3/2012 | Nam | G01F 9/001 701/123 |
| 2012/0084248 | A1 * | 4/2012 | Gavrilescu | G06F 16/9535 706/52 |
| 2012/0105635 | A1 * | 5/2012 | Erhardt | B60R 25/102 348/148 |
| 2012/0226421 | A1 * | 9/2012 | Kote | B60R 25/20 701/51 |
| 2013/0018677 | A1 * | 1/2013 | Chevrette | G06Q 40/08 705/4 |
| 2013/0041521 | A1 * | 2/2013 | Basir | B60R 25/33 701/1 |
| 2013/0141249 | A1 * | 6/2013 | Pearlman | G09B 19/14 340/870.03 |
| 2013/0144770 | A1 * | 6/2013 | Boling | G08G 1/207 705/35 |
| 2013/0144771 | A1 * | 6/2013 | Boling | G08G 1/127 705/35 |
| 2013/0218368 | A1 * | 8/2013 | Kokes | G06Q 10/06 701/1 |
| 2013/0226399 | A1 * | 8/2013 | Miller | B60R 25/20 701/36 |
| 2013/0232027 | A1 * | 9/2013 | Reich | G06Q 30/0631 705/26.7 |
| 2013/0289797 | A1 * | 10/2013 | Johnson | G06F 17/00 701/1 |
| 2013/0300552 | A1 * | 11/2013 | Chang | B60Q 9/00 340/436 |
| 2013/0304515 | A1 * | 11/2013 | Gryan | G06Q 40/08 705/4 |
| 2013/0344856 | A1 * | 12/2013 | Silver | G06N 20/00 455/418 |
| 2014/0094987 | A1 * | 4/2014 | Healey | B60R 25/00 701/1 |
| 2014/0106732 | A1 * | 4/2014 | Silver | G06F 16/24578 455/418 |
| 2014/0108058 | A1 * | 4/2014 | Bourne | G06Q 40/08 705/4 |
| 2014/0108155 | A1 * | 4/2014 | Johnson, Jr. | G06Q 20/342 705/14.66 |
| 2014/0122164 | A1 * | 5/2014 | Lucara | G06Q 10/047 705/7.28 |
| 2014/0129080 | A1 * | 5/2014 | Leibowitz | B60R 16/023 701/33.3 |
| 2014/0129113 | A1 * | 5/2014 | Van Wiemeersch | F02D 28/00 701/102 |
| 2014/0180727 | A1 * | 6/2014 | Freiberger | G07C 5/008 705/4 |
| 2014/0200737 | A1 * | 7/2014 | Lortz | B60R 25/25 701/1 |
| 2014/0266623 | A1 * | 9/2014 | Graumann | B60K 28/02 340/10.1 |
| 2014/0278586 | A1 * | 9/2014 | Sanchez | G06Q 40/00 705/4 |
| 2014/0309849 | A1 * | 10/2014 | Ricci | H04L 67/10 701/33.4 |
| 2014/0344062 | A1 * | 11/2014 | Lamont | H04W 4/80 705/14.64 |

(56) References Cited

U.S. PATENT DOCUMENTS

| | | | |
|---|---|---|---|
| 2015/0025705 A1* | 1/2015 | Burger | B60R 16/037 701/1 |
| 2015/0025917 A1* | 1/2015 | Stempora | G06K 9/0061 705/4 |
| 2015/0049192 A1* | 2/2015 | Hooton | B60R 11/04 348/148 |
| 2015/0106289 A1* | 4/2015 | Basir | G07C 5/08 705/325 |
| 2015/0170253 A1* | 6/2015 | Kim | G06Q 30/0631 705/26.7 |
| 2015/0187013 A1* | 7/2015 | Adams | G06Q 30/0283 705/4 |
| 2015/0191178 A1* | 7/2015 | Roy | B60W 40/09 701/36 |
| 2015/0228129 A1* | 8/2015 | Cox | G07C 5/0808 701/29.1 |
| 2016/0001782 A1* | 1/2016 | Fiedler | B60R 25/20 340/5.81 |
| 2016/0036964 A1* | 2/2016 | Barfield, Jr. | H04W 4/02 455/418 |
| 2016/0086397 A1* | 3/2016 | Phillips | G07C 5/0808 701/32.4 |
| 2016/0094707 A1* | 3/2016 | Stuntebeck | H04M 1/72577 455/418 |
| 2016/0203656 A1* | 7/2016 | Bhogal | G07C 5/008 701/32.2 |
| 2016/0260269 A1* | 9/2016 | Pietschmann | G06Q 30/02 |
| 2016/0292768 A1* | 10/2016 | Needham | G06Q 30/0631 |

* cited by examiner

TELEMATICS SYSTEM, APPARATUS AND METHOD

CROSS REFERENCE TO RELATED APPLICATIONS

This application is a Continuation of U.S. patent application Ser. No. 14/941,248 filed Nov. 13, 2015, which claims priority to U.S. Patent Application Ser. No. 62/079,651 filed Nov. 14, 2014 which is incorporated herein by reference in its entirety.

FIELD OF THE INVENTION

The disclosed embodiments generally relates to the field of computers and similar technologies, and more particularly, to a system, method, and computer-usable medium relating to vehicle telematics.

BACKGROUND OF THE INVENTION

Current methods of providing insurance are based on statistical analysis of a multitude of risk factors related to a wide variety of personal and demographic information associated with an insured. While these methods have become more sophisticated over time, they still have their limitations. As an example, the cost of an automobile insurance policy is often based on the age and sex of the insured, their primary geographic location, as well as the class of their vehicle. Other factors, such as the number of miles the insured drives in a year, and the ratio of business to personal miles driven, is increasingly being taken into consideration. All of these risk factors are then typically compared to the accident incidence and claim rates of a pool of drivers that are the same sex and age group, drive the same class of vehicle, live in the same geographical area, and drive a similar number of miles every year. These comparisons generally provide useful information related to the frequency, and cost, of claims made by members of the insured pool. However, these approaches remain generalized and are not oriented to the travel behavior of a specific insured or insured vehicle.

Latest developments in automotive electronics are dealing with the automatic monitoring of the state of a vehicle such as a car, bus, train, airplane, or any similar vehicle. Such monitoring is based on the integration of numerous sensors into the vehicle such that important functional parts and components may be monitored. It is becoming of increasing interest to collect a variety of information, regarding different aspects of a vehicle, which may have different applications depending on their usage.

The use of telematics in automobiles has become more common in recent years, particularly as implemented with in-car navigation systems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and process for using telematics data to determine a vehicle operator is described in which telematics data is captured from a telematics device which retrieves data from a device which is associated with a particular vehicle and a plurality of vehicle operators. A driver electronic signature is determined from the captured telematics data and then compared to the determined driver signatures stored in memory and associated with the vehicle from which the telematics data is captured. A vehicle operator is then determined from comparing the determined driver signature with driver signatures stored in memory.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
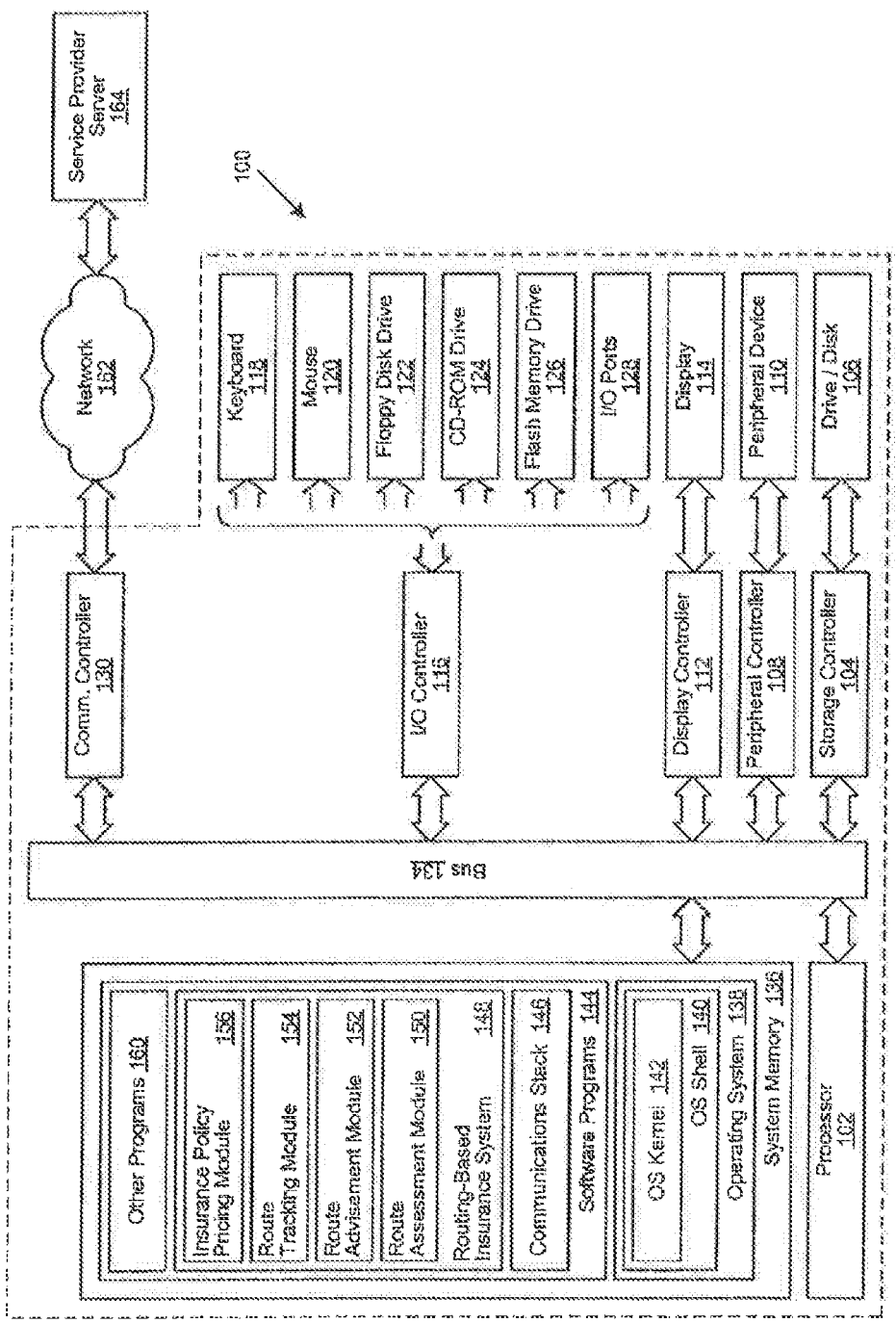
FIG. 1 depicts an exemplary client information processing system (IPS) in which embodiments of the disclosure may be implemented.

A system, method, and computer-usable medium are disclosed for managing an insurance policy using telematics.

As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

This application relates to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to one or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146 and other programs 160. The communications stack 146 is operable to implement any communication protocol enabling various embodiments of the disclosure. Software programs 144 also include a routing-based insurance system 148, which comprises a route assessment module 150, a route advisement module 152, a route tracking module 154, and an insurance policy pricing module 156. The routing-based insurance system 148 includes computer executable instructions for implementing the processes described in FIGS. 2-6 described herein below. In one embodiment, client IPS 100 is able to download the computer executable instructions of the routing-based insurance system 148 from a service provider server 164 located at a remote location. In another embodiment, the computer executable instructions of the routing-based insurance system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

In accordance with certain embodiments described herein, it is to be understood and appreciated that telematics generally refers to solutions that are based on information flowing to and/or from a vehicle. For example, vehicle telematics can refer to automobile systems that combine Global Positioning System (GPS) tracking and other wireless communications for automatic roadside assistance and remote diagnostics. When implemented, telematics have the potential to increase operational efficiency and improve driver safety in a number of ways. For example, GPS technology can be used to track a vehicle's location, mileage, and speed. Communications technology promotes connectivity between drivers and other parties such as service dispatchers (e.g., public safety answering point or PSAP, traffic data aggregator, commercial telematics service providers or call centers such as Onstar Corporation, and the like). Sensors monitor vehicle operations and conditions which can then be used to streamline vehicle maintenance, or facilitate seeking assistance for the vehicle occupants. For example, accelerometers measure changes in speed and direction, and cameras can monitor road conditions, and drivers' actions. Additional sensor devices may monitor and/or determine vehicle fuel efficiency, remaining battery charge (e.g., utilized to power a vehicle's transmission) and/or battery charge consumed for a one or more vehicle trips.

It is to be further understood and appreciated that in embodiments illustrated herein, at least one accelerometer is preferably provided, which may be provided as a vehicle component or in a portable telematics device 204 (which may include a smart phone device). It is also to be appreciated that device 204 may also encompass a vehicle-to-vehicle (V2V) and vehicle-to-infrastructure (V2I) data capture device. For instance, a networked roadway camera may capture license plate information and derived time/location for the vehicle. The accelerometer, preferably an XYZ or 3-axis accelerometer, can be used for crash and other significant event detection.

Three axis is preferred because the orientation of the accelerometer will change from car to car depending on mounting method. In certain embodiments, the accelerometer can be a 3-axis (XYZ) accelerometer capable of measuring G forces up to a range of, for example, 15 G or higher, or in other exemplary embodiments, up to 25 G or higher, to insure that the accelerometer reading does not clip during a crash. This is required in order to obtain an accurate delta velocity ($\Delta V$) reading. In addition, when the accelerometer is mounted securely in the vehicle, the accelerometer can more accurately capture G forces transmitted through the body of the vehicle. Another option, for example, is to use a 2-axis (XY) accelerometer capable of measuring G forces in the range of 15 G or higher, or in the range of 25 G or higher, which is aligned or calibrated based on the installation orientation to measure lateral forces on the vehicle. The calibration is an extra step but it allows the use of a 2-axis accelerometer.

Figure 2:
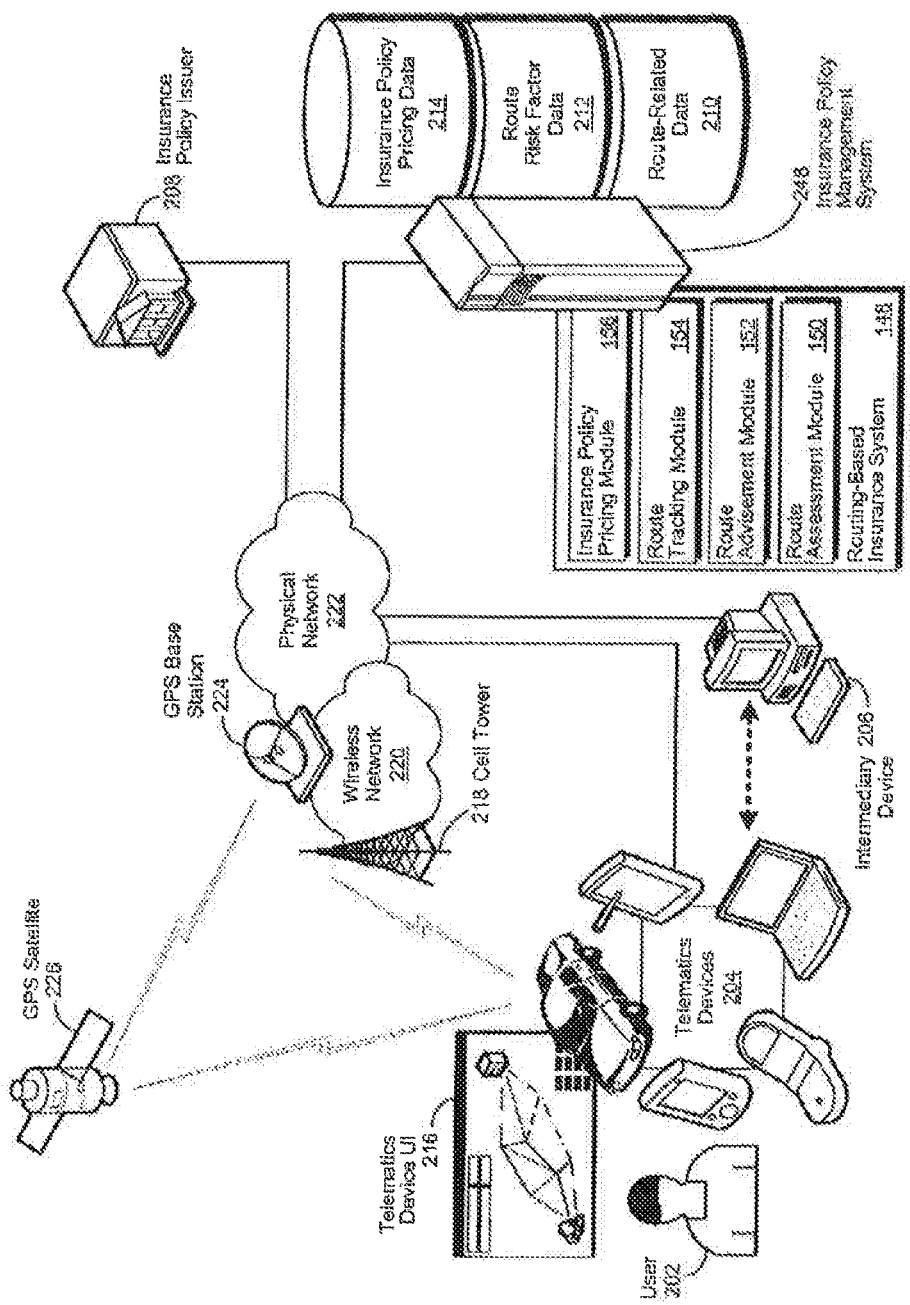
FIG. 2 is a simplified block diagram of a routing-based insurance system as implemented in accordance with an embodiment of the disclosure.

FIG. 2 is a simplified block diagram of a routing-based insurance system as implemented in accordance with an embodiment of the disclosure. In various embodiments, a routing-based insurance system 148 is implemented with an insurance policy management system 248 for the provision of routing-based insurance to a user 202. It is to be appreciated that in the context of the present illustrated embodiment, a user 202 may also encompass semi-autonomous and autonomous vehicles.

In these and other embodiments, the insurance policy management system comprises the routing-based insurance system 148, a repository of route-related data 210, a repository of route risk factor data 212, and a repository of insurance policy pricing data 214. The routing-based insurance system 148 further comprises a route assessment module 150, a route advisement module 152, a route tracking module 154, and an insurance policy pricing module 156.

In various embodiments, a telematics device 204 exchanges information in near real-time, or non-real-time, directly or indirectly, through one or more networks 220, 222 and intermediary devices 206, with the routing-based insurance system 148. As used herein, telematics broadly refers to the integrated use of telecommunications and informatics. More specifically, and as mentioned above, telematics refers to the receiving, storing, processing and sending of information via telecommunication devices, such as the telematics devices 204. As likewise used herein, a device used in a telematics system may comprise an On Board Device (OBD) which preferably connects to a vehicles Engine Control Unit (ECU), a smart phone device, a laptop computer, a tablet computer, a personal digital assistant (PDA), V2V devices, V2I device, wearable computing devices, a mobile telephone, or any device operable to receive, process, store, and transmit information. Likewise, a telematics system device may also comprise a navigation device or a geographic positioning system (GPS), such as embodied in a GPS satellite 226 and a GPS base station 224 attached to a physical network 222 or wireless network 220.

Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter. In these and other embodiments, a vehicle may comprise any method of transportation, including but not limited to, an automobile, a motorcycle, a bicycle, an aircraft, or an aquatic vessel. In one embodiment, the telematics device 204 is not implemented with a vehicle. Instead, the telematics device is implemented for use by a user 202 traversing a route on foot. In this embodiment, the movement of the user 202 along a route is monitored by the telematics device 204.

In various embodiments, data related to the user's 202 traversal of a route is provided by the telematics device 204 to the routing-based insurance system 148. In one embodiment, the data is provided by the telematics device 204 directly to the routing-base insurance system 148 through a wireless connection to a cell tower 218 of the wireless network 220, which is likewise connected to physical network 222. In another embodiment, the data is provided by the telematics device 204 directly to the routing-base insurance system 148 through a connection to the physical network 222. In yet another embodiment, the data is indirectly provided by the telematics device 204 to the routing-base insurance system 148 through an intermediary device 206, which in turn is connected to the physical network 222. It will be apparent to skilled practitioners of the art that many such embodiments are possible for the receipt, storage, processing, and transmittal of routing-based insurance information by the telematics devices 204, and the foregoing are not intended to limit the spirit, scope or intent of the disclosure.

In various embodiments, the telematics device 204 determines the current location of an insured (e.g., user 202) of a routing-based insurance policy issued by an insurance policy issuer 208. In one embodiment, the current location is determined by using GPS technology, such as that provided by the GPS base station 224 and GPS satellite 226, implemented in a vehicle navigation system. In another embodiment, the current location is automatically determined by the telematics device 204. In yet another embodiment, the current location is provided to the telematics device 204 by the user 202. Once determined, the current location of the user 202 is submitted to the routing-based insurance system 148, directly or indirectly, by the telematics device 204.

In one embodiment, the user 202 knows their destination in advance and uses a telematics device 204 to submit the destination location, directly or indirectly, to the routing-based insurance system 148. The routing-based insurance system 148 then processes information related to the current location and the destination location to determine available route segments between the two locations. In one embodiment, the information related to the current location and the destination location is stored in a repository of route-related data 210. In another embodiment, the user 202 may not have a specific destination in mind. If that is the case, then available route segments originating from the current location are determined.

Once the route segments have been determined, a set of risk score data is generated for each of the available route segments. It is to be appreciated the risk score data may be used to determine a driver's "Driving Score", which driving score may be cumulative for a prescribed time period or can be determined a trip-by-trip basis.

In various embodiments, the set of risk score data is generated from a plurality of risk factor data associated with each route segment. As used herein, risk factor data refers to data that can be used to characterize one or more risk factors for a route segment. In one embodiment, the risk factor data related to a route segment is stored in the repository of route risk factor data 212. In one embodiment, the set of risk factor score data is generated by the route assessment module 150.

A set of risk score differential data is generated for each of the route segments. In one embodiment, the risk score differential data is generated by the route assessment module 150 performing comparison operations between a first set of risk score data and a second set of risk score data as described in greater detail herein. Information related to each route segment is then retrieved for use as routing instructions. For example, the routing instructions may include information associated with a map. In one embodiment, the information related to each route segment is stored in the repository of route-related data 210. Route advisement data, comprising the routing instructions and the set of risk score differential data for the route segment, is generated. In one embodiment, the route advisement data is generated by the route advisement module 152 of the routing-based insurance system 148. The route advisement data is then provided to the telematics device 204, where it is displayed within the user interface (UI) 216 of the telematics device. Once displayed, a route segment is selected by the user 202 for traversal, followed by the submission of the selected route segment by the telematics device 204 to the routing-based insurance system 148.

The selected route segment is then traversed by the user 202 and route traversal data is generated. In one embodiment, the route traversal data is generated by the route tracking module 154 from data related to the user's 202 traversal of the selected route segment. The set of risk score differential data associated with the traversed route segment is determined and then associated with the insured's insurance policy. Insurance policy price data, corresponding to the traversed route segment, is then generated by processing the route segment's associated set of risk score differential data. In turn, the route traversal data and the insurance policy price data associated with the traversed route segment is processed to generate insurance policy adjustment data. In one embodiment, the insurance policy price data and the insurance policy adjustment data is generated by the insurance policy pricing module 156. The insurance policy price adjustment data is processed by an insurance policy pricing module 156 to modify pricing data associated with the insured's insurance policy.

Figure 3:
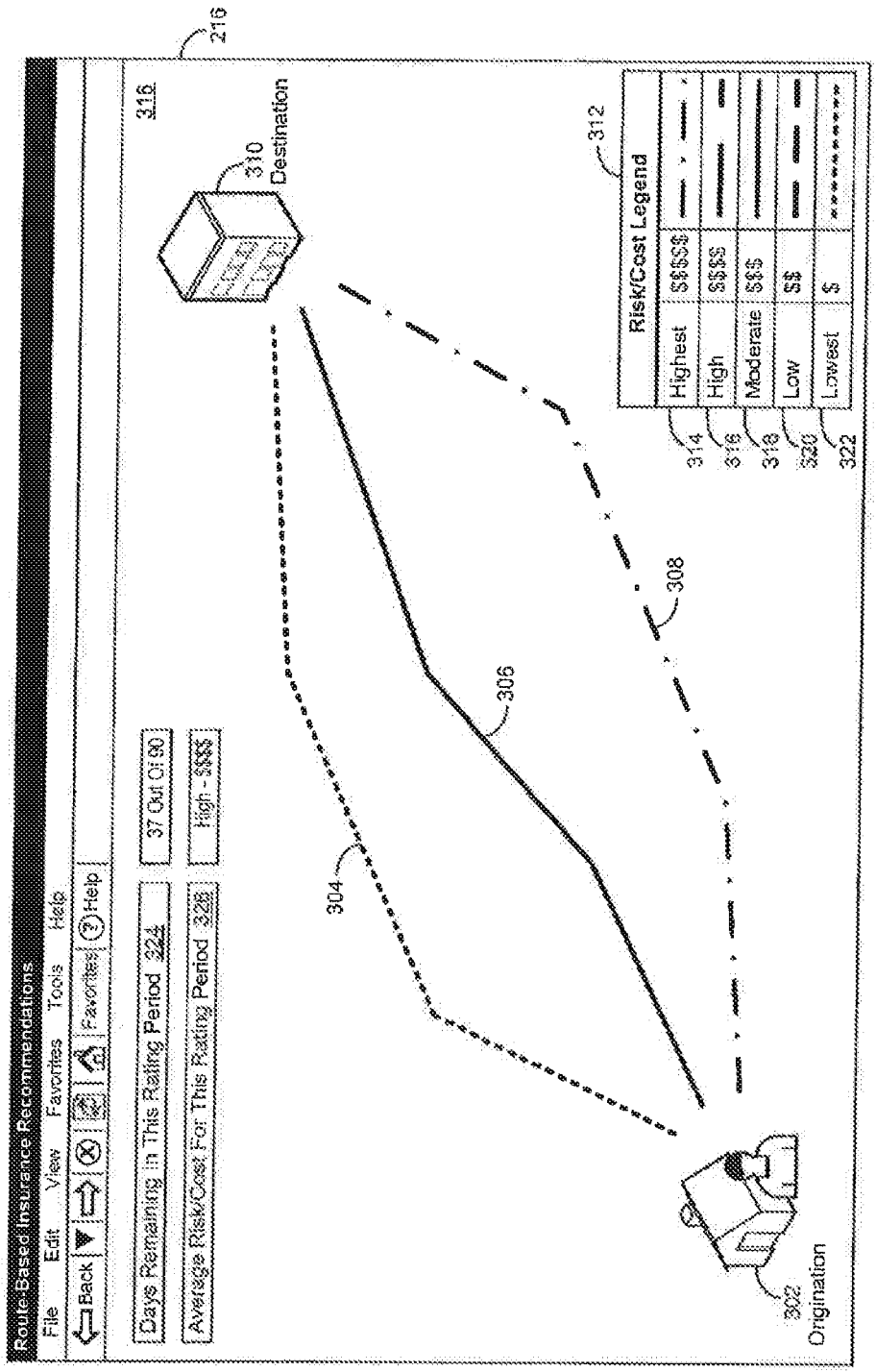
FIG. 3 is a simplified illustration of a routing-based insurance system as implemented within a window of a user interface in accordance with an embodiment of the disclosure for displaying a risk score associated with a route.

FIG. 3 is a simplified illustration of a routing-based insurance system as implemented within a window of a user interface in accordance with an embodiment of the disclosure for displaying a risk score associated with a route. In various embodiments, route advisement data is provided by a routing-based insurance system for display within a window 330 of the user interface 216 of a telematics device, which is described in greater detail herein. As illustrated in FIG. 3, the route advisement data comprises a 'Risk/Cost' legend 312, an origination location 302, a destination location 310, and a plurality of routes 304, 306, 308 connecting the two locations. As likewise illustrated in FIG. 3, the route advisement data also comprises data display fields for the "Days Remaining in This Rating Period" 324 and the "Average Risk/Cost for This Rating Period" 326. The 'Risk/Cost' legend 312 further comprises a plurality of risk and cost information elements. As an example, the first risk and cost information element 314 is shown to have the highest risk, which corresponds to the highest insurance cost, while the last risk and cost information element 322 is shown to have the lowest risk, which corresponds to the lowest insurance cost. As likewise shown in FIG. 3, the remaining risk and cost information elements 316, 318, and 320 respectively have a high, moderate, and low risk, which respectively correspond to a high, moderate, and low insurance cost.

In various embodiments, visual attributes are applied to the plurality of routes 304, 306, 308 to indicate their respective risk and corresponding insurance cost. As an example, the uppermost route 304 is associated with the last risk and cost information element 322, indicating that it has the lowest risk and the lowest corresponding insurance cost. Likewise, the middle route 306 is associated with the middle risk and cost information element 318, indicating that it has moderate risk and a corresponding moderate insurance cost. In a like fashion, the lowest route 308 is associated with the upper risk and cost information element 314, indicating that it has the highest risk and a corresponding highest insurance cost. It will be apparent to those of skill in the art that many such embodiments are possible.

Figure 4:
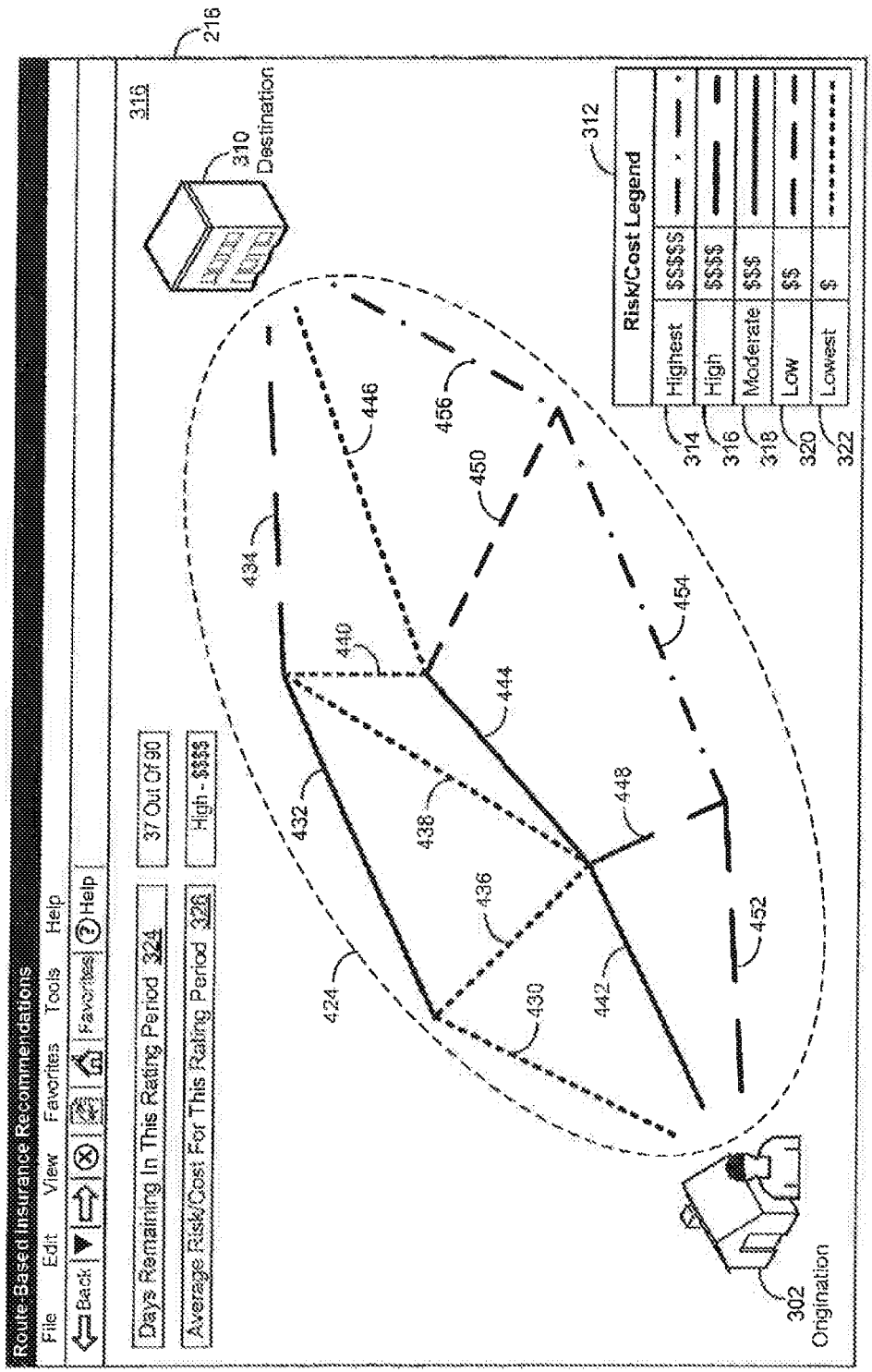
FIG. 4 is a simplified illustration of a routing-based insurance system as implemented within a window of a user interface in accordance with an embodiment of the disclosure for displaying a risk score associated with a route segment.

FIG. 4 is a simplified illustration of a routing-based insurance system as implemented within a window of a user interface in accordance with an embodiment of the disclosure for displaying a risk score associated with a route segment.

In various embodiments, route advisement data is provided by a routing-based insurance system for display within a window 330 of the user interface 216 of a telematics device, which is described in greater detail herein. As illustrated in FIG. 4, the route advisement data comprises a 'Risk/Cost' legend 312, an origination location 302, a destination location 310, and a plurality of route segments 424 connecting the two locations. As likewise illustrated in FIG. 4, the route advisement data also comprises data display fields for the "Days Remaining in This Rating Period" 324 and the "Average Risk/Cost for This Rating Period" 326. The 'Risk/Cost' legend 312 further comprises a plurality of risk and cost information elements. As an example, the first risk and cost information element 314 is shown to have the highest risk, which corresponds to the highest insurance cost, while the last risk and cost information element 322 is shown to have the lowest risk, which corresponds to the lowest insurance cost. As likewise shown in FIG. 3, the remaining risk and cost information elements 316, 318, and 320 respectively have a high, moderate, and low risk, which respectively correspond to a high, moderate, and low insurance cost.

In various embodiments, visual attributes are applied to the plurality of route segments 424 to indicate their respective risk and corresponding insurance cost. As an example, route segments 430, 436, 438, 440, and 446 are associated with the last risk and cost information element 322, indicating that they have the lowest risk and the lowest corresponding insurance cost. Likewise, route segment 450 is associated with the next lowest risk and cost information element 320, indicating that it has low risk and a corresponding low insurance cost. In a like fashion, the route segments 442, 444, and 432 are associated with the middle risk and cost information element 318, indicating that they have a moderate risk and a corresponding moderate insurance cost. Likewise, the route segments 448 and 452 are associated with the next highest risk and cost information element 316, indicating that they have a high risk and a corresponding high insurance cost. As likewise illustrated in FIG. 4, the route segments 454 and 456 are associated with the highest risk and cost information element 314, indicating that they have the highest risk and a corresponding highest insurance cost.

It will be apparent to those of skill in the art that a user can view the route advisement information and make appropriate risk and insurance cost trade-off determinations. As an example, a route comprising route segments 430, 436, 438, 440, and 446 may provide the least risky route with the lowest insurance cost, but at the expense of traveling longer distances, taking longer to arrive at the destination 310, and possibly higher fuel costs. Conversely, a route comprising route segments 452, 454, and 456 may decrease the distance traveled and shorten travel time, but at a higher risk and a corresponding increase in insurance costs. However, a route comprising route segments 442, 444, and 446, would provide moderate travel distance and time along with moderate risk and insurance costs.

Figure 5A:
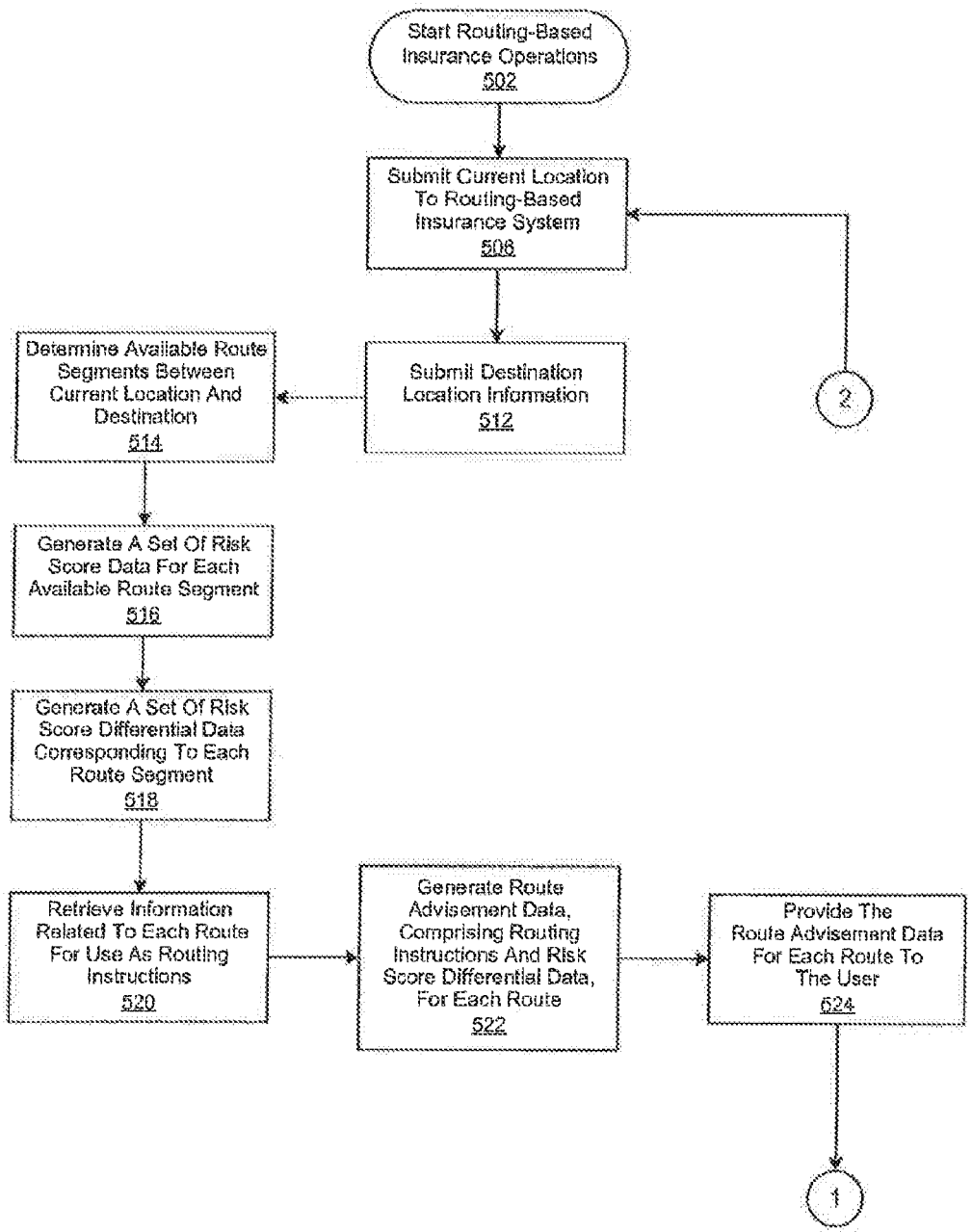
FIGS. 5A and 5B are a generalized flowchart of the operation of a routing-based insurance system as implemented in accordance with an embodiment of the disclosure.
Figure 5B:
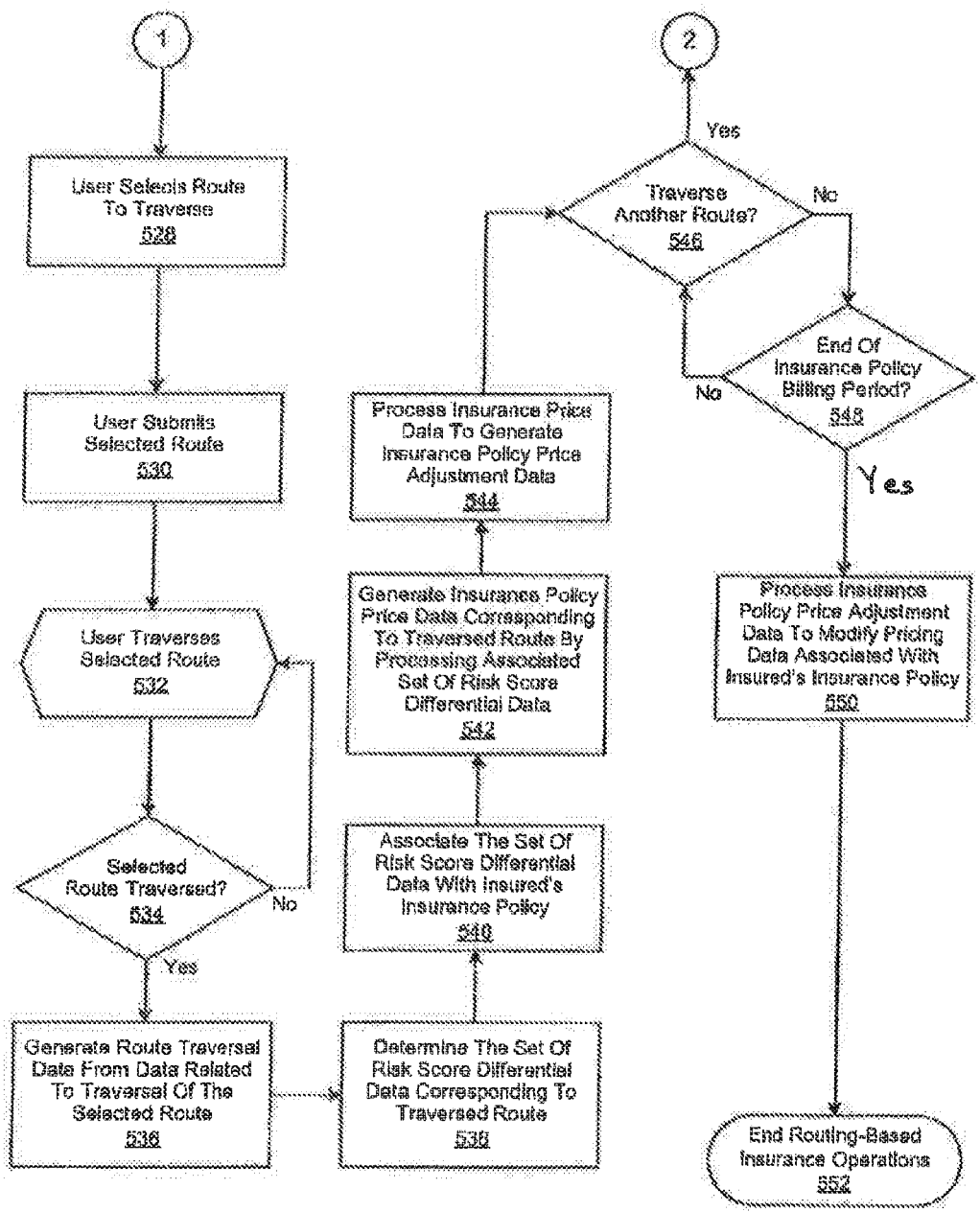

FIGS. 5A and 5B are a generalized flowchart of the operation of a routing-based insurance system as implemented in accordance with an embodiment of the disclosure. In this embodiment, routing-base insurance operations are begun in block 502, followed by the submission of the current location of an insured of a routing-based insurance policy to the routing-based insurance system in block 506. Destination location information is then submitted to the routing-based insurance system in block 512. The routing-based insurance system then processes information related to the current location and the destination location in block 514 to determine available routes between the two locations. In one embodiment, the information related to the current location and the destination location is stored in a repository of route-related data.

A set of risk score data is generated for each of the available routes in block 516. In various embodiments the set of risk score data is generated from a plurality of risk factor data associated with each route. As used herein, risk factor data refers to data that can be used to characterize one or more risk factors for a route. As an example, one risk factor may be crime statistics for an area traversed by the route. As another example, historical accident rates for the route may provide a risk factor. Other examples include road surface conditions, inclement weather, visibility (e.g., driving in the sun (sun glare)), construction activities, traffic conditions, or pending natural disasters. It will be apparent to those of skill in the art that many such risk factors are possible and the foregoing are not intended to limit the spirit, scope, or intent of the disclosure. In one embodiment, the risk factor data related to a route is stored in a repository of route risk factor data. In one embodiment, the set of risk factor score data is generated by a route assessment module.

In block 518, a set of risk score differential data is generated for each of the routes. In one embodiment, the risk score differential data is generated by a route assessment module performing comparison operations between a first set of risk score data and a second set of risk score data as described in greater detail herein. Information related to each route is then retrieved for use as routing instructions in block 520. For example, the routing instructions may include information associated with a map. In one embodiment, the information related each route is stored in a repository of route-related data. Route advisement data, comprising the routing instructions and the set of risk score differential data for the route segment, is generated in block 522. In one embodiment, the route advisement data is generated by a route advisement module of the routing-based insurance system. The route advisement data is then provided to the user in block 524.

A route segment is selected by the user in block 528 to traverse, followed by the submission of the selected route by the user to the routing-based insurance system in block 530. The selected route is then traversed in block 532, followed by a determination in block 534 whether the selected route has been traversed. If not, the process continues, proceeding with block 532. Otherwise, route traversal data is generated from data related the traversal of the selected route block 536. In one embodiment, the route traversal data is generated from data related to the traversal of the selected route by a route tracking module of the routing-based insurance system. The set of risk score differential data associated with the traversed route is determined in block 538, followed by its association with the insured's insurance policy in block 540.

In block 542, insurance policy price data, corresponding to the traversed route, is generated by processing the route's associated set of risk score differential data. In block 544, the route traversal data and the insurance policy price data associated with the traversed route is processed to generate insurance policy adjustment data. In one embodiment, the insurance policy price data and the insurance policy adjustment data is generated by an insurance policy pricing module of the routing-based insurance system. A determination is then made in block 546 whether to traverse another route. If so, then the process continues, proceeding with block 506. Otherwise, a determination is made in block 548 if an insurance policy price adjustment is available. If not, then the process continues, proceeding with block 546. Otherwise, the insurance policy price adjustment data is processed in block 550 to modify pricing data associated with the insured's insurance policy. In one embodiment, the insurance policy price adjustment data is processed by an insurance policy pricing module of the routing-based insurance system to modify pricing data associated with the insured's insurance policy. Routing-based insurance operations are then ended in block 552.

Figure 6A:
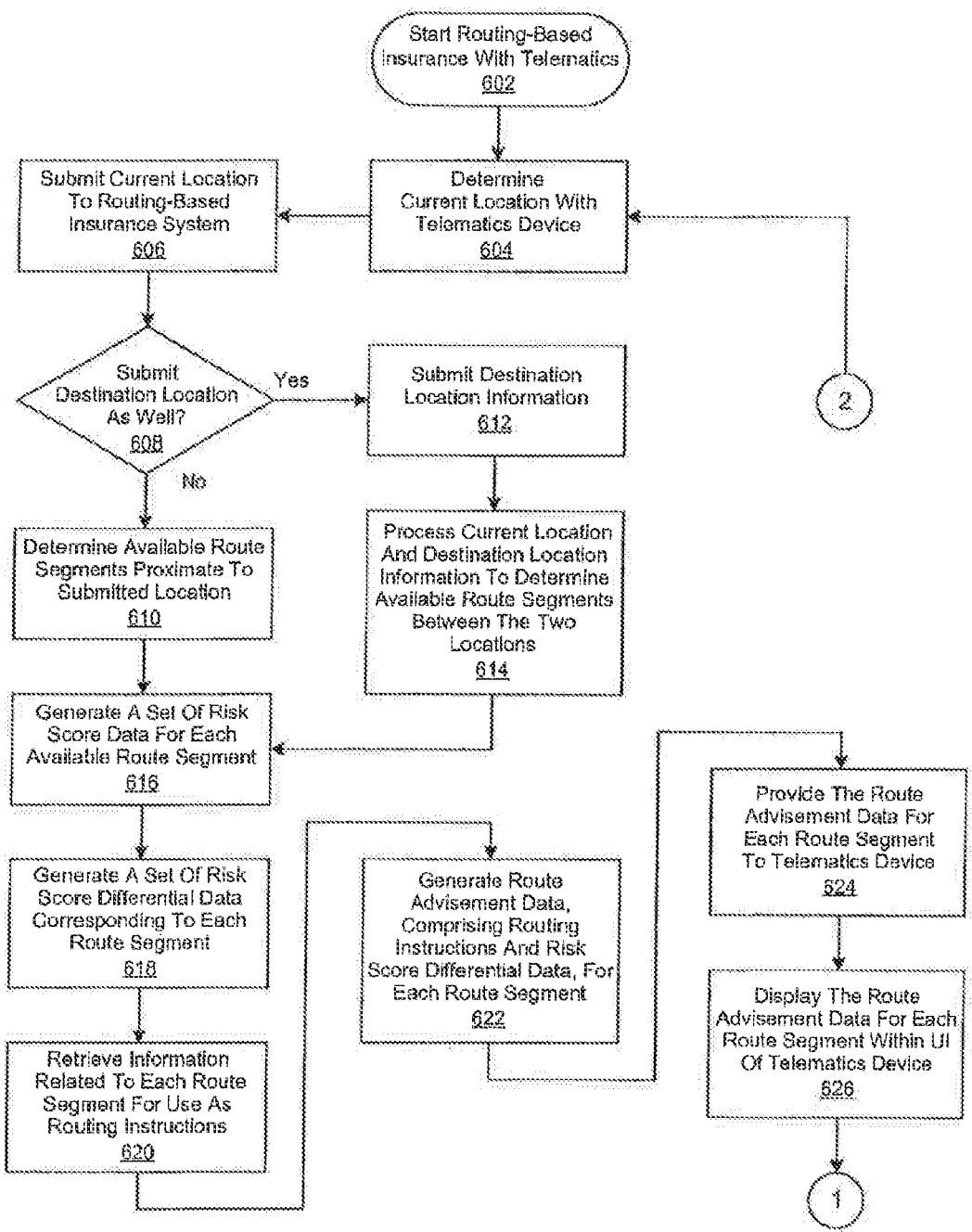
FIGS. 6A and 6B are a generalized flowchart of the operation of a routing-based insurance system as implemented with a telematics system in accordance with an embodiment of the disclosure.
Figure 6B:
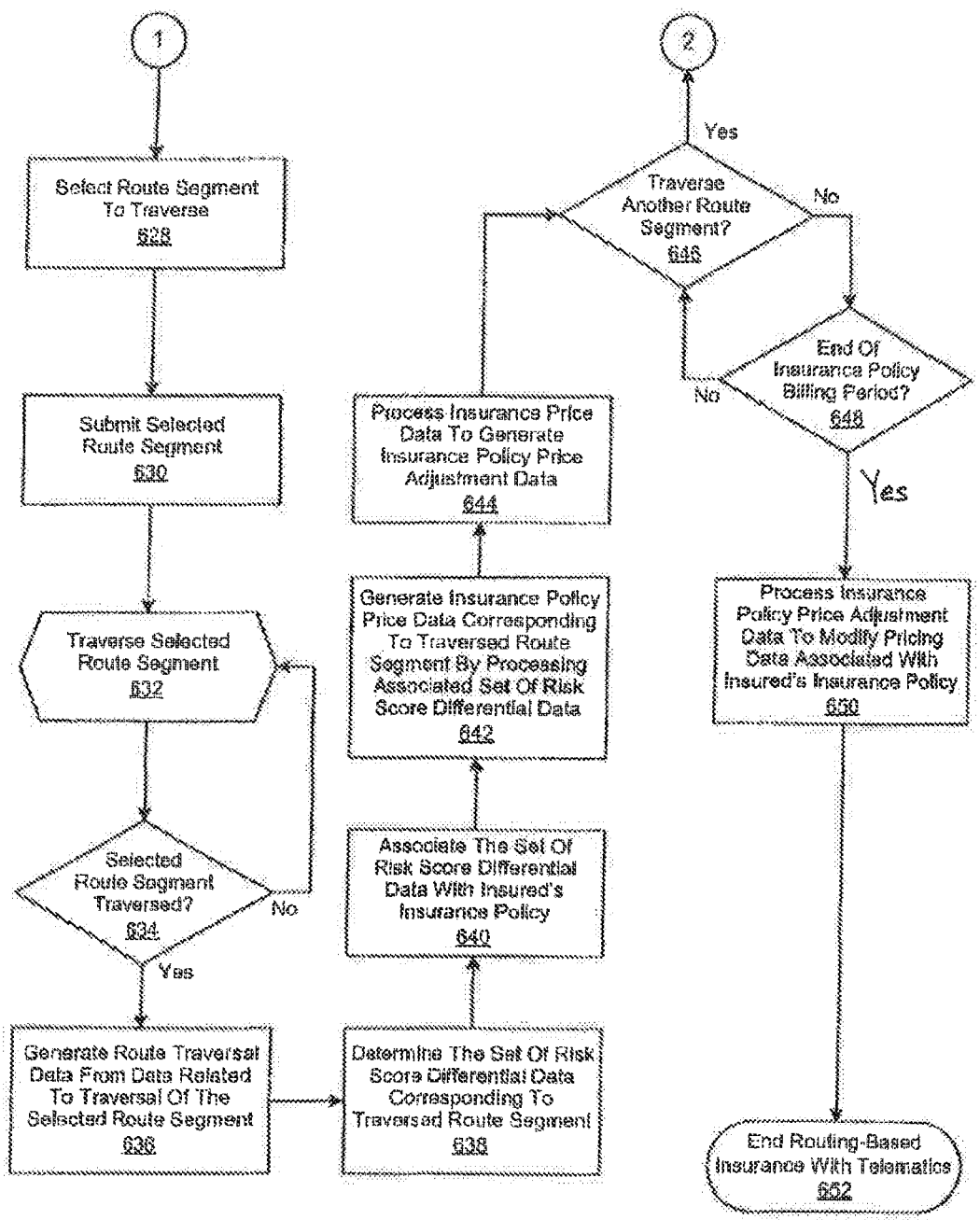

FIGS. 6A and 6B are a generalized flowchart of the operation of a routing-based insurance system as implemented with a telematics system in accordance with an embodiment of the disclosure. As used herein, telematics broadly refers to the integrated use of telecommunications and informatics. More specifically, telematics refers to the receiving, storing, processing and sending of information via telecommunication devices. As likewise used herein, a device used in a telematics system may comprise a laptop computer, a tablet computer, a personal digital assistant (PDA), a mobile telephone, or any device operable to receive, process, store, and transmit information. Likewise, a telematics system device may also comprise a navigation device or a geographic positioning system (GPS). Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter.

In various embodiments, a telematics device exchanges information in near real-time, or non-real-time, directly or indirectly, through one or more networks and intermediary devices, with a routing-based insurance system. In these and other embodiments, a vehicle may comprise any method of transportation, including but not limited to, an automobile, a motorcycle, a bicycle, an aircraft, or an aquatic vessel. In one embodiment, the telematics device is not implemented with a vehicle. Instead, the telematics device is implemented for use by a user traversing a route on foot. In this embodiment, the movement of the user along a route is monitored by the telematics device. Data related to the user's traversal of the route is then provided by the telematics device to the routing-based insurance system.

Referring now to FIG. 6a, routing-based insurance operations using a telematics device are begun in block 602, followed by the telematics device determining the current location of an insured of a routing-based insurance policy in block 604. In one embodiment, the current location is determined by using GPS technology implemented in a vehicle navigation system. In another embodiment, the current location is automatically determined by the telematics device. In yet another embodiment, the current location is provided to the telematics device by a user. The current location of the insured is then submitted to the routing-based insurance system in block 606.

A determination is then made in block 608 whether a destination location is submitted by the insured as well. As an example, the user may know their destination in advance. If so, then the destination location is submitted to the routing-based insurance system in block 612. The routing-based insurance system then processes information related to the current location and the destination location in block 614 to determine available route segments between the two locations. In one embodiment, the information related to the current location and the destination location is stored in a repository of route-related data. However, if it is determined in block 608 that a destination location is not provided by the user, then available route segments proximate to the current location are determined in block 610. As an example, a user may not have a specific destination in mind. If that is the case, then available route segments originating from the current location are determined. However, if a destination location has been provided, then route segments, individually or in combination, that provide one or more routes between the two locations are determined.

Once the route segments have been determined in either block 610 or block 614, a set of risk score data is generated for each of the available route segments in block 616. In various embodiments, the set of risk score data is generated from a plurality of risk factor data associated with each route segment. As used herein, risk factor data refers to data that can be used to characterize one or more risk factors for a route segment. As an example, one risk factor may be crime statistics for an area traversed by the route segment. As another example, historical accident rates for the route segment may provide a risk factor. Other examples include road surface conditions, inclement weather, visibility, construction activities, traffic conditions, or pending natural disasters. It will be apparent to those of skill in the art that many such risk factors are possible and the foregoing are not intended to limit the spirit, scope, or intent of the disclosure. In one embodiment, the risk factor data related to a route segment is stored in a repository of route risk factor data. In one embodiment, the set of risk factor score data is generated by a route assessment module.

In block 618, a set of risk score differential data is generated for each of the route segments. In one embodiment, the risk score differential data is generated by a route assessment module performing comparison operations between a first set of risk score data and a second set of risk score data. As an example, sets of risk score data for five route segments are compared. One set of risk score data may be highest, another lowest, and the remaining three between the highest and the lowest. The respective sets of risk score data are then processed to generate a set of risk score differential data for each route segment, characterized as a numerical value. For example, a numerical value (e.g., '5') may be assigned to the route segment having the highest set of risk score data and another numerical value (e.g., '1'), may be assigned to the route segment having the lowest set of risk score data. The remaining three route segments may have numerical values of '2,' '3,' and '4,' corresponding to the proportion of their respective sets of risk score data to the highest and lowest sets of risk score data. In this example, the numerical value of one risk factor is lowest, one is highest, two are next to lowest, one is next to highest, and none are halfway between lowest and highest.

As another example, the numeric value for a set of risk score data for an exemplary route segment of 'moderate' risk may be a '3.' In contrast, the numeric value of a set of risk score data for a target route segment may be a '5,' indicating that it is a 'high' risk route segment. The comparison operations between the two route segments results in the generation of risk score differential data with a value of '+2,' signifying the target route segment represents a higher amount of risk than the exemplary, 'moderate' risk, route segment. It will be apparent to skilled practitioners of the art that many such approaches to the generation of sets of risk score data, risk score differential data, and their corresponding numeric values are possible and the foregoing are not intended to limit the spirit, scope or intent of the disclosure.

Information related to each route segment is then retrieved for use as routing instructions in block 620. For example, the routing instructions may include information associated with a map. In one embodiment, the information related to each route segment is stored in a repository of route-related data. Route advisement data, comprising the routing instructions and the set of risk score differential data for the route segment, is generated in block 622. In one embodiment, the route advisement data is generated by a route advisement module of the routing-based insurance system. The route advisement data is then provided to the telematics device in block 624, where it is displayed in block 626 within the user interface (UI) of the telematics device. Once displayed, a route segment is selected in block 628 to traverse, followed by the submission of the selected route segment by the telematics system to the routing-based insurance system in block 630.

The selected route segment is then traversed in block 632, followed by a determination in block 634 whether the selected route segment has been traversed. If not, the process continues, proceeding with block 632. Otherwise, route traversal data is generated from data related to the traversal of the selected route segment in block 636. In one embodiment, the route traversal data is generated from data related to the traversal of the selected route segment by a route tracking module of the routing-based insurance system. The set of risk score differential data associated with the traversed route segment is determined in block 638, followed by its association with the insured's insurance policy in block 640.

In block 642, insurance policy price data, corresponding to the traversed route segment, is generated by processing the route segment's associated set of risk score differential data. In block 644, the route traversal data and the insurance policy price data associated with the traversed route segment is processed to generate insurance policy adjustment data. In one embodiment, the insurance policy price data and the insurance policy adjustment data is generated by an insurance policy pricing module of the routing-based insurance system. A determination is then made in block 646 whether to traverse another route segment. If so, then the process continues, proceeding with block 604. Otherwise, a determination is made in block 648 if an insurance policy price adjustment is available. If not, then the process continues, proceeding with block 646. Otherwise, the insurance policy price adjustment data is processed in block 650 to modify pricing data associated with the insured's insurance policy. In one embodiment, the insurance policy price adjustment data is processed by an insurance policy pricing module of the routing-based insurance system to modify pricing data associated with the insured's insurance policy. Routing-based insurance operations using a telematics device are then ended in block 652.

Figure 7:
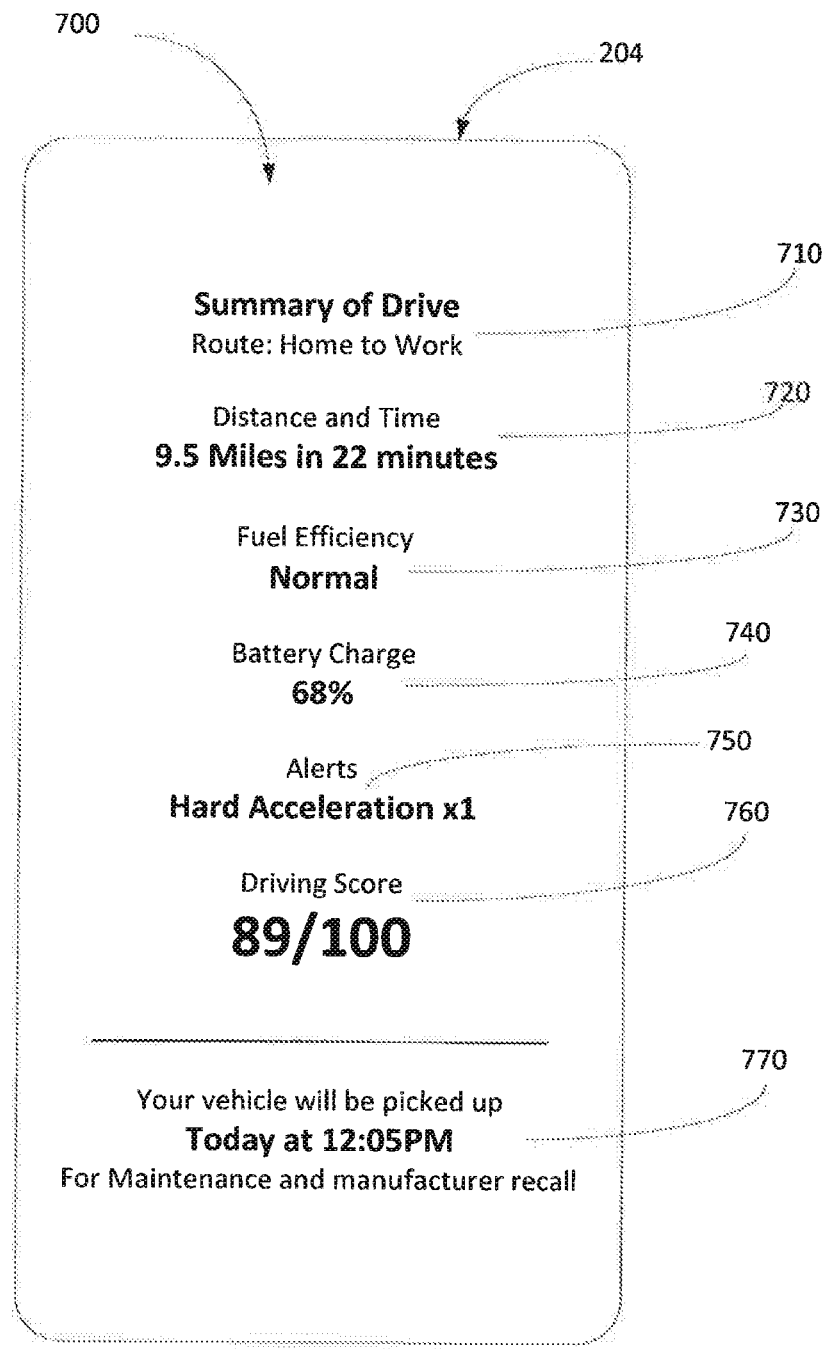
FIG. 7 is an illustration of Graphical User Interface (GUI) indicating aggregated vehicle telematics information associated with a user's trip in accordance with an embodiment of the disclosure.

With certain illustrated embodiments described above, discussion will turn to additional illustrated embodiments using telematics which gather and determine information as described above. With reference now to FIG. 7, system 248 is preferably configured and operative to generate a Graphical User Interface (GUI) 700, which GUI 700 may be displayed on a telematics device 204 (e.g., UI 216), or may be displayed on an external user computing device having a display (e.g., a user's smart phone or tablet device) connected to system 248 via network(s) 220, 222.

The contents of the GUI 700 preferably include determined telematics data and vehicle information relating to a completed user trip. It is to be understood what is described herein with reference to GUI 700 is an illustrative embodiment having certain vehicle information and telematics data, which GUI 700 is not to be limited thereto, as it may encompass other vehicle information and telematics data preferably determined by system 248, which may also be user selected for inclusion or exclusion on GUI 700.

In the illustrative embodiment of FIG. 7, GUI 700 preferably includes Summary of Drive 710 which preferably indicates the route/trip traveled by the user to which the data indicated on GUI 700 relates to. For instance, this data may a Distance and Time 720 associated with the subject route/trip. The Fuel Efficiency 730 associated with the subject route/trip is indicated so as to preferably apprise the user of the vehicle's fuel efficiency associated with the subject route/trip (which fuel efficiency may preferably vary due to a host of factors, including but not limited to vehicle type, weather conditions, route traveled, local geography, etc.). Additionally, if the vehicle is a battery operated vehicle (e.g., the transmission is powered at least in part by an electric motor), the remaining Battery Charge 740 on the vehicle is preferably indicated. It is noted if the vehicle is a battery operated vehicle, the aforesaid Fuel Efficiency 730 is then preferably contingent upon the electric charge (e.g., electric current/voltage) consumed for the subject route/trip travelled.

With regards to the driving score as discussed above, GUI 700 may also indicate driving Alerts 750 indicating one or more, and the frequency of, determined vehicle operation infractions (e.g., hard acceleration incidents) incurred during the subject route/trip travelled. System 248 is further preferably configured and operative to determine a Driving Score 760 associated with the subject route/trip travelled, which Driving Score 760 is preferably contingent upon the aforesaid Route Risk Factor and Score Data 212 and/or vehicle information relating to a completed user trip, as discussed above. As also noted above with respect to the Route Risk Factor and Score Data 212, in another illustrated embodiment, the insurance policy price adjustment data is processed by an insurance policy pricing module of the routing-based insurance system 248 to modify pricing data associated with the insured's insurance policy at least contingent upon the aforesaid determined Driving Score 760.

As mentioned above, while certain information is shown in FIG. 0.7 to be included in GUI 700, this information is not to be limited thereto as it may encompass other categories of information 770 which may be input to system 248 via a user or via a third party (e.g., an automobile repair shop, preferably via network(s) 220,222).

In addition, and in conjunction with, the above disclosed illustrated embodiments, further illustrative embodiments include:

Total Cost of Ownership
Utilize vehicle telematics captured data to determine total cost of vehicle ownership (e.g., analyze behavior at gas stations) and provide recommendation for increased efficiency of vehicle operation Vehicle History Report
Determine and provide vehicle history report premised upon aggregated telematics history (e.g., maintenance, driving habits, etc.)

Driver and Passenger Health Determinations
Determine health of driver and/or passengers in a vehicle using telematics (e.g., determine sleepiness, heart rate, aggressive driving). Determine health, dependent upon various variables including speed, acceleration/deceleration rates, distance, altitude changes, time, g-forces, etc. which have varying effects on each person in a vehicle. Benchmark against health of like vehicles in a geo-fence. Utilize carbon monoxide sensors for determining sleepiness.

Wearable Computing Devices in a Vehicle
Integrate wearable computing devices with vehicle operation and telematics such that wearable computing devices indicate vehicle performance/maintenance and related recommendations (e.g., gas available at Exit 3, vehicle has less than ¼ tank). Wearable computing controls operation of vehicle base on driver health (e.g., vehicle display indicates certain actions to be taken in view of driver/passenger health). It is to be appreciated that such wearable computing devices may also be used to provide in-cabin feedback to drivers and passengers.

Passenger Identification
Utilizing informatics, determine/identify passengers in the vehicle to determine driving score and liability profile. For instance, if an inexperienced driver, such as a teen driver, is driving with other teen passengers, then that would represent a higher liability risk and driving score.

Member Behavior Detection
Utilize telematics to determine insured member behavior (e.g., food purchase (eating habits), determine financial stress, purchase habits) to determine driver and vehicle habits.

Vehicle Type Recommendation
Utilize telematics to determine what type vehicle should be driven based on miles driven, vehicle cost of ownership, driver demographics, vehicle age, warranty coverage, current financial deals, etc.

Vehicle Camera Operation
Utilize telematics to trigger operation of a camera when vehicle operating improperly and/or incident detected for image information capture.

Policy Compliance Adjustments
Utilize telematics to automatically adjust insurance policy to confirm to State statutory minimum insurance coverage based on vehicle location (e.g., geo-fencing). Utilize telematics for a "dynamic" coverage insurance policy (e.g., if it is detected that a driver is driving 500 miles/week, premium/minimum coverage goes up. If it's detected that a driver parks a car in a dangerous area every day, premium/minimum coverage goes up). The telematics may further detect when a vehicle is no longer in use (e.g., placed in storage) so as to make adjustments to an auto policy covering such a vehicle and then detect when the vehicle is being used again (e.g., removed from storage) so as to renew auto insurance policy.

Driver Rating by Non Vehicle Operator
Provide ability to rate other drivers/vehicles for insurance policy purposes (e.g., smart phone device in a passenger capacity utilized to captured vehicle telematics).

Vehicles Communicate Telematics Data with One Another (Directly or Indirectly)
Triggered when vehicles collide for incident reporting to automate claims processing. Determine conditions other vehicles have encountered (e.g., windshield wiper usages, engine idling, etc.). Transmit fault code that a driver ahead has mechanical issues (e.g., brake lights not operating properly).

On Demand Insurance
Provide certain insurance coverage for a predetermined time period—geo-fencing provides coverage zones having differing insurance rates and policy coverage. Utilize telematics to verify compliance and policy changes required.

For instance, and with reference to the above FIGS. 1-7, and with particular emphasis on FIG. 2, another such illustrative embodiment is now described which generally relates to utilizing telematics data to determine the user 202 of a vehicle.

It is to be appreciated telematics data is captured from a telematics device (e.g, a OBD Type II, device, smart phone or other computing device) so as to retrieve data from a vehicle associated with a plurality of vehicle user 202. It is to be also appreciated that stored in memory of system 248 are the users 202 associated with a particular vehicle, with each stored driver having a predetermined "driver signature". A driver signature can consist of any recorded data associated with the driving habits of a particular driver, such as (but not limited to) frequent locations visited by a driver (e.g., home, work, gym, school, etc.), routes driven, driving style (acceleration and/or braking patterns, average speed traveled), and the like. Such driver signatures can be entered in the system in any known methods including (and not limited to) being predetermined by a driver or determined by historical driving patterns of a driver as preferably determined by analytics upon data captured from telematics devices 204.

Once telematics data is captured from one or more telematics devices 204 associated with a vehicle, the system 248 is configured to determine a driver electronic signature from the captured telematics data using analytics upon the captured data. The determined driver signature (as mentioned above) for the vehicle is then compared with the aforesaid driver signatures stored in the memory of system 248 which are associated with the vehicle from which the telematics data is captured. The system 248 then determines a vehicle operator via comparing the determined driver signature with driver signatures stored in the memory. Determining the operator of the vehicle can provide many advantages, including (and not limited to) using an insurance policy underwriting module to generate insurance policy data for the vehicle in response to determined operator history for the vehicle (e.g., if it is determined teenagers frequently drive the vehicle, the premium of the policy for the vehicle may be adjusted). An additional advantage may include a configuration signal being sent (e.g., from system 248 or another suitable system) to the vehicle, which signal is received by the vehicle control system so as to configure the vehicle in accordance with vehicle configuration preferences associated with the determined vehicle operator (e.g., seat, pedal, and/or mirror adjustments, engine performance changes (e.g., reduce performance for certain drivers), climate system preferences and the like).

In accordance with the teachings of the present invention, another advantage of determining the driver signature can include the system 248 being further configured to determine a change of life status for the determined vehicle operator contingent upon the determined driver electronic signature. For instance, if the driver no longer travels to a workplace, it may be determined the driver has lost their job. Once a change of life status a determined by the system 248, a determination may be made whether one or more product or services are available to the determined driver and applicable to the determined change of life status. For instance, non-employment type benefits and/or open job positions. Additionally, the driver signature may be utilized by system 248 to determine a driver score for the vehicle operator when it is determined a life status change occurred for the vehicle operator. For instance, has the effect of the driver losing their job caused them to be a safer or more risk prone driver.

In another illustrated embodiment, the system 248 may be configured to cause the disablement of one or more features of a determined driver's smart phone device. Thus, once a driver of a vehicle has been determined (as mentioned above), one or more features of a driver's smart phone device (such as email, text messages, and other driver distracting applications) is disabled while the driver operates the vehicle (as previously determined by the ongoing capturing of telematics data). Preferably, a driver will install an application on their smart phone device which interacts with the system 248 to provide the aforesaid disablement functionality preferably via transmitting a signal to the driver's smart phone device. It is noted an OBD Type II device may also provide this functionality via electronic coupling to the driver's smart phone device.

Yet another illustrated embodiment includes the system 248 utilizing the aforesaid captured telematics data to determine the occurrence of an accident for the vehicle to determine if notification was provided regarding the determined accident occurrence within a prescribed time period following the determined accident occurrence. Or in contrast, if an accident claim was provided for a vehicle, the system 248 may utilize the telematics data to determine if the vehicle was indeed involved in an accident during a specified time period based upon analytics of the captured telematics data (e.g., for fraud detection purposes).

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanent, removable or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer-usable medium embodying computer program code, which when executed by a computer, causes the computer to perform a process of using telematics data to determine a vehicle operator, the process comprising:

capturing telematics data from a telematics device retrieving data from a vehicle;

determining a driver electronic signature from the captured telematics data;

determining a vehicle operator based upon the determined driver electronic signature;

determining a loss of job for the determined vehicle operator from the captured telematics data based upon detection of the determined vehicle operator no longer traveling to a workplace associated with the determined vehicle operator;

determining whether the loss of job has caused the determined vehicle operator to be a more risk prone driver by determining a drive score for the determined vehicle operator when the loss of job has been determined for the determined vehicle operator; and transmitting a signal to a user device associated with the determined vehicle operator causing one or more features on the user device to be disabled while the vehicle is being operated.

2. The non-transitory computer-usable medium as recited in claim 1, wherein the captured data is transmitted from the telematics device to the computer via a cellular telecommunications network.

3. The non-transitory computer-usable medium as recited in claim 1, wherein the user device is a smart phone device.

4. The non-transitory computer-usable medium as recited in claim 1, wherein the one or more disabled features includes email functionality.

5. The non-transitory computer-usable medium as recited in claim 1, wherein the one or more disabled features includes texting functionality.

* * * * *